(12) United States Patent
Schultz

(10) Patent No.: US 8,951,025 B2
(45) Date of Patent: *Feb. 10, 2015

(54) DUAL DRIVE PUMP SYSTEM

(75) Inventor: John C. Schultz, Saline, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 776 days.

This patent is subject to a terminal disclaimer.

(21) Appl. No.: 13/182,189

(22) Filed: Jul. 13, 2011

(65) Prior Publication Data

US 2012/0082570 A1    Apr. 5, 2012

Related U.S. Application Data

(60) Provisional application No. 61/388,344, filed on Sep. 30, 2010.

(51) Int. Cl.
| F04B 49/00 | (2006.01) |
| F04B 35/04 | (2006.01) |
| F04B 17/00 | (2006.01) |
| F16H 61/00 | (2006.01) |

(52) U.S. Cl.
CPC ........ F16H 61/0028 (2013.01); *F16H 2312/14* (2013.01)
USPC ......... 417/319; 417/429; 74/661; 123/179.31

(58) Field of Classification Search
USPC ............. 417/319, 326, 350, 429; 123/179.25, 123/179.31, 198 C; 74/655, 661, 665 A, 74/665 B, 665 R, 730.1
See application file for complete search history.

(56) References Cited

U.S. PATENT DOCUMENTS

| 6,575,865 | B2 | 6/2003 | Takenaka et al. |
| 6,656,083 | B2* | 12/2003 | Esaki ................... 477/5 |
| 6,860,726 | B2* | 3/2005 | Carter, III et al. ............ 417/319 |
| 7,549,847 | B1* | 6/2009 | McClatchey .................... 417/15 |
| 8,651,843 | B2* | 2/2014 | Schultz ......................... 418/110 |
| 8,689,759 | B2* | 4/2014 | Schultz .................... 123/179.31 |
| 2008/0194369 | A1* | 8/2008 | Boutou et al. .................... 475/5 |
| 2012/0034123 | A1* | 2/2012 | Schultz ......................... 418/144 |
| 2012/0080003 | A1* | 4/2012 | Schultz .................... 123/179.31 |

* cited by examiner

*Primary Examiner* — Peter J Bertheaud
*Assistant Examiner* — Dominick L Plakkoottam

(57) ABSTRACT

A dual drive pump system for rear wheel or front wheel drive automatic transmission in a motor vehicle includes a dual drive pump disposed off-axis of the transmission input shaft axis and driven by a gear train driven by a hub. The dual drive pump is also driven by a gear train driven by an auxiliary motor. Torque multiplication through the gear train allows the dual drive pump to have a smaller displacement while still providing the hydraulic pressure needs of the transmission. The dual drive pump may be driven by either an engine or the auxiliary motor depending on the operating conditions of the motor vehicle.

15 Claims, 5 Drawing Sheets

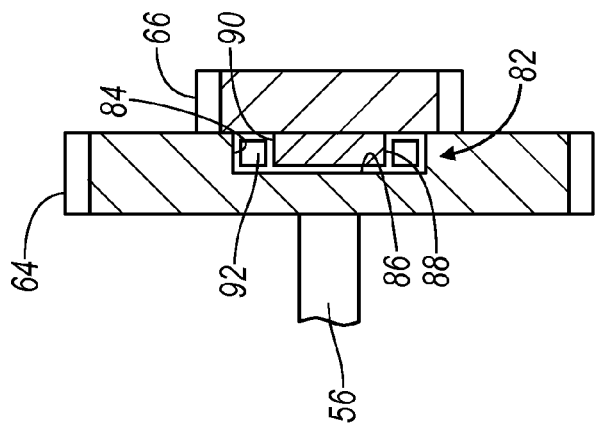
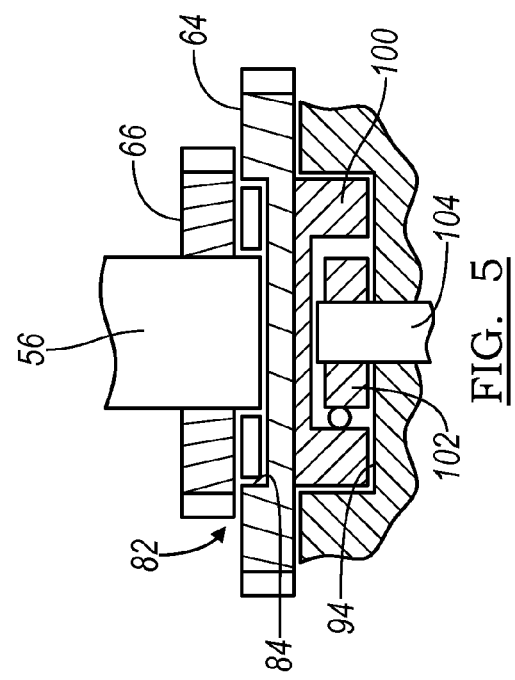
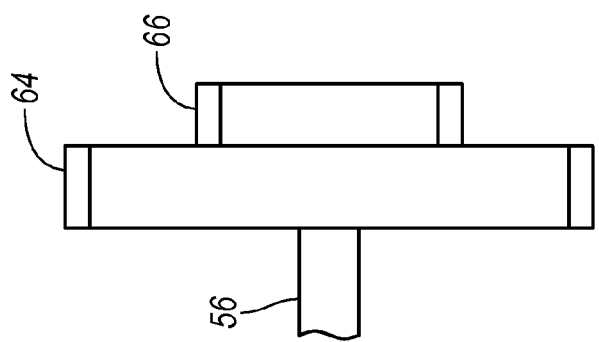

DUAL DRIVE PUMP SYSTEM

CROSS-REFERENCE TO RELATED APPLICATIONS

This application claims the benefit of U.S. Provisional Application No. 61/388,344 filed on Sep. 30, 2010. The disclosure of the above application is incorporated herein by reference.

FIELD

The present disclosure relates to a dual drive hydraulic pump for an automatic transmission and more particularly to an off-axis transmission pump that is selectively powered by two prime movers to allow engine stop-start and hot engine idle starts.

BACKGROUND

The statements in this section merely provide background information related to the present disclosure and may or may not constitute prior art.

Hydraulic motor vehicle transmissions, that is, automatic transmissions for passenger cars and light duty trucks having a plurality of gear assemblies controlled by clutches and brakes, generally include a dedicated hydraulic pump which provides pressurized transmission (hydraulic) fluid to control valves and actuators. These control valves and actuators engage the clutches and brakes and provide the various gear ratios or speeds.

Such dedicated pumps are generally fixed displacement pumps such as vane or gear pumps that are driven at engine speed from the hub of the torque converter or other startup device located between the engine and the transmission. Such pumps have many design goals. Since the pump is constantly driven at engine speed, it is desirable that it have high efficiency. Additionally, since the pump is most frequently mounted concentric to the engine axis, small size, particularly axial length, is desirable in order not to increase the length of the transmission.

In vehicles having engine stop-start where the engine shuts down during stops in order to increase fuel economy, the pump must be operable to prime or position the clutches and/or brakes by keeping the clutch hydraulic circuits filled with low pressure hydraulic fluid. Various solutions have been proposed to allow the pump to prime the hydraulic circuit during an engine stop-start, such as using auxiliary pumps or accumulators. However, typical designs sacrifice packaging, energy consumption, noise pollution, cost and/or complexity to achieve their goals. Accordingly, there is room in the art for a transmission pump system that has efficient packaging while having reduced complexity and energy costs while still providing adequate engine stop-start performance in terms of energy usage and noise.

SUMMARY

In one example of the principles of the present invention, a dual drive pump system for an automatic transmission is provided. The dual drive pump system includes a dual drive pump disposed off-axis of the transmission input shaft axis and driven by a gear train driven by a hub. The dual drive pump is also driven by a gear train driven by an auxiliary motor. Torque multiplication through the gear train allows the dual drive pump to have a smaller displacement while still providing the hydraulic pressure needs of the transmission. The dual drive pump may be driven by either an engine or the auxiliary motor depending on the operating conditions of the motor vehicle.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a side view of an embodiment a pump gear set according to the principles of the present invention;

FIG. 4 is a partial cross-sectional view of an embodiment of a pump gear set having an integrated one-way clutch according to the principles of the present invention;

FIG. 5 is a partial cross-sectional view of a gear pump with an integrated one-way clutch according to the principles of the present invention;

DETAILED DESCRIPTION

The following description is merely exemplary in nature and is not intended to limit the present disclosure, application, or uses.

Figure 1:
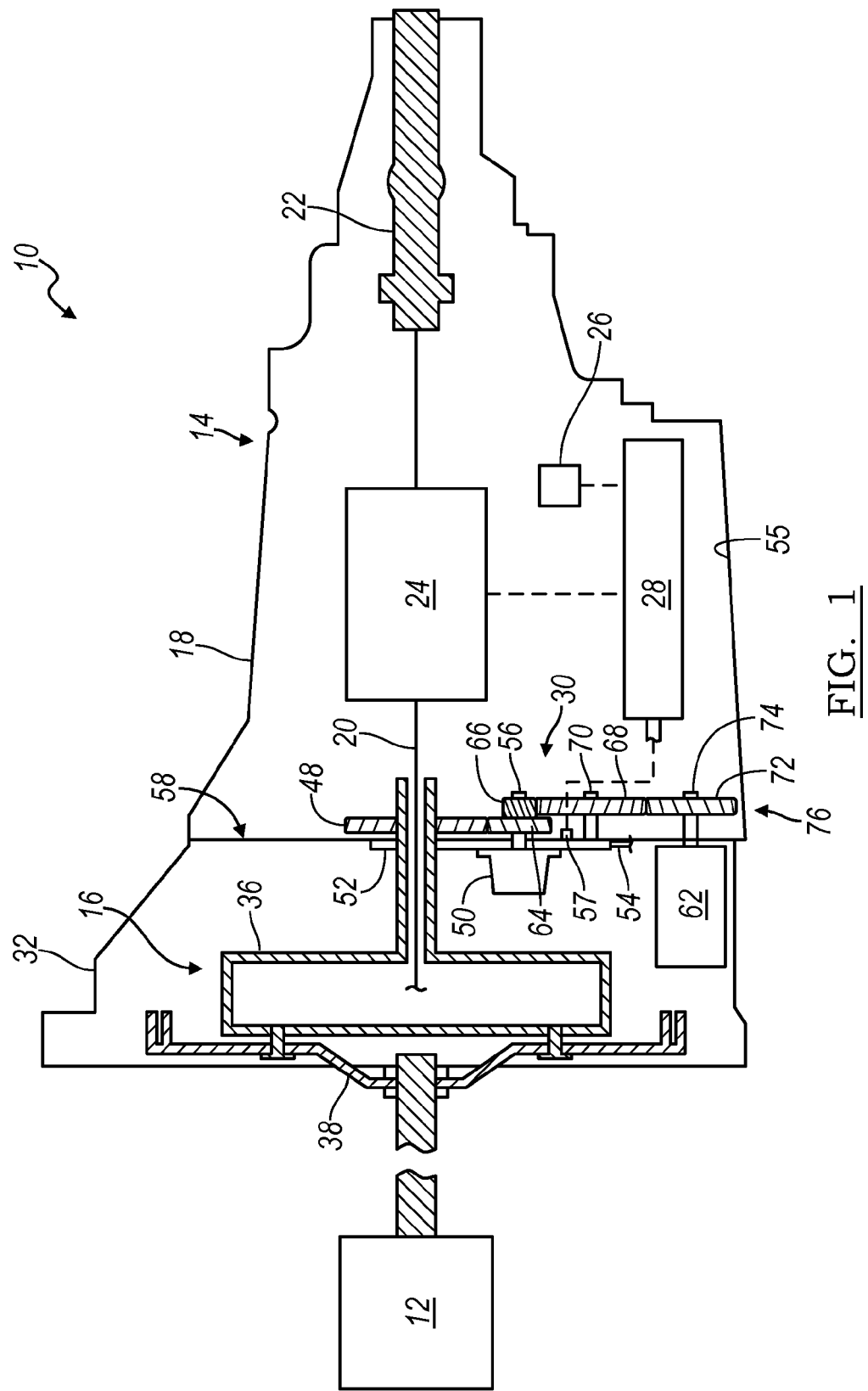
FIG. 1 is a schematic view of an exemplary powertrain of a motor vehicle according to the principles of the present invention.

With reference to FIG. 1, an exemplary powertrain for a motor vehicle is generally indicated by reference number 10. The powertrain 10 includes an engine 12 interconnected to a transmission 14. The engine 12 may be a conventional internal combustion engine or an electric engine, or any other type of prime mover, without departing from the scope of the present disclosure. The engine 12 supplies a driving torque to the transmission 14 through a starting device 16. The starter device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. It should be appreciated that while the transmission 14 is illustrated as a rear wheel drive transmission, the transmission 14 may be a front wheel drive transmission, as described below, without departing from the scope of the present disclosure. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit (not shown) which may include, for example, propshafts, differential assemblies, and drive axles. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes, and shafts within the transmission 14 may vary without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the clutches/brakes via a hydraulic control system 28. The hydraulic control system 28 is operable to selectively engage the clutches/brakes by selectively communicating a hydraulic fluid to the clutches/brakes that engages the clutches/brakes. The hydraulic fluid is communicated to the clutches/brakes under pressure from a dual pump system 30 connected to the hydraulic control system 28, as will be described in greater detail below.

The starting device 16 is housed within a bell housing 32. The bell housing 32 is generally cast aluminum and includes openings, counterbores, flanges, shoulders and other features which receive, locate and support the various components of the starting device 16 as well as the dual pump system 30. Generally speaking, the starting device 16 includes a hub, shell, or other member 36 that is directly driven by the engine 12 via a flexplate connection 38 or other type of connection. The hub 36 extends through the bell housing 32 and into the transmission housing 18. A first drive gear 48 is fixedly connected to the hub 36 by any suitable means such as, for example, complementary flats, interengaging splines, one or more drive pins or set screws, a friction fit or a combination of any of these elements.

Figure 2:
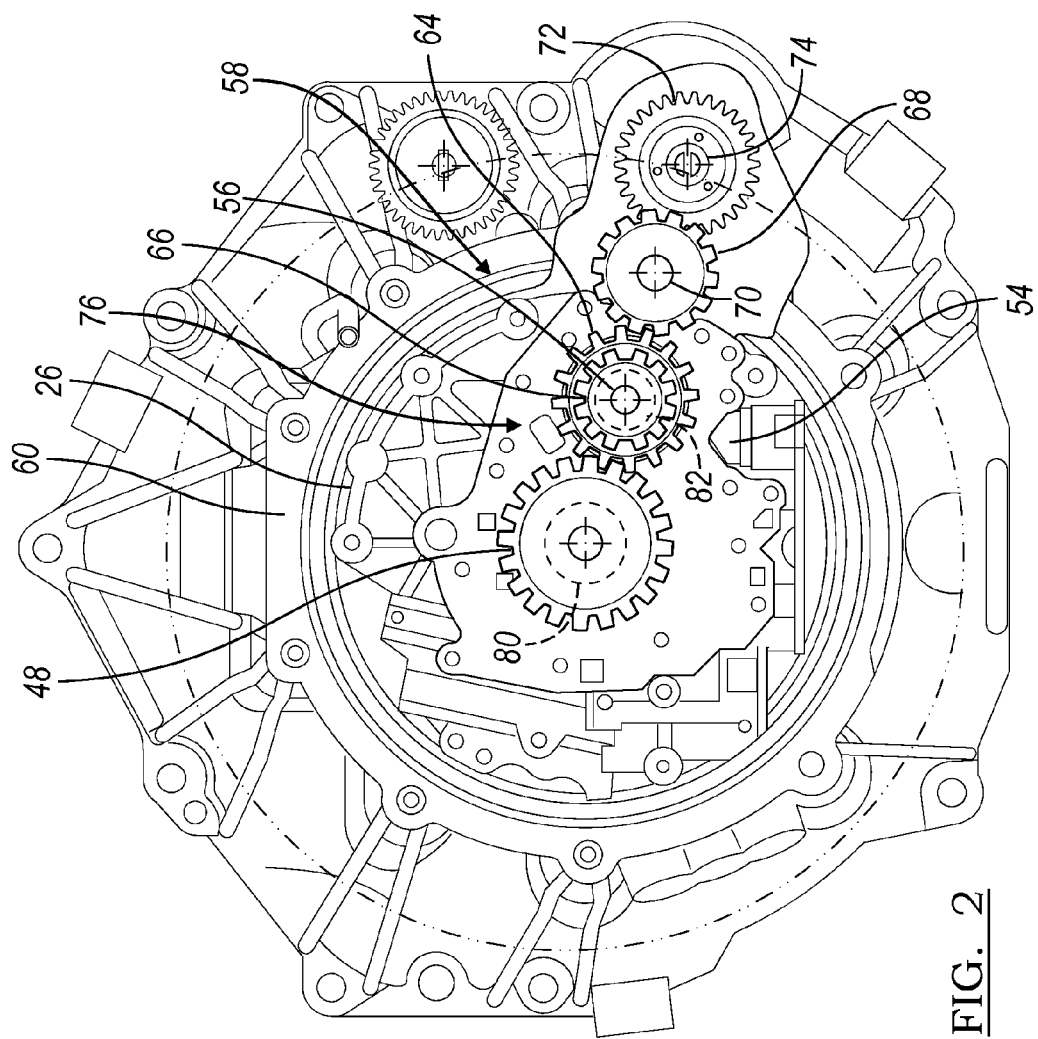
FIG. 2 is a rear, transmission side view of an exemplary bell housing according to the principles of the present invention.

With combined reference to FIGS. 1 and 2, the pump system 30 of the transmission 14 includes an off-axis pump 50. The pump 50 is mounted in a support plate 52 which typically includes a fluid inlet or suction passageway 54 for the pump 50 that communicates with a sump 55 in the transmission 14 and an outlet port 57 that communicates with various components in the transmission 14 including the hydraulic control system 28. As illustrated in FIG. 2, the suction passageway 54 is disposed more proximate the center of the bell housing 32, improving porting and further enhancing the mounting flexibility of the pump 50. The support plate 52, and therefore the pump 50, is mounted on an inside of the bell housing 32. The pump 50 includes a drive shaft or input shaft 56 that extends through the bell housing 32 to a transmission side 58 of the bell housing 32. The transmission side 58 includes a connector flange 60, best seen in FIG. 2, that circumnavigates the components of the pump system 30 located on the transmission side 58. The connector flange 60 is configured to mate with the transmission housing 18 so that starting device 16 is essentially a modular unit.

The pump 50 is driven by two prime movers including the engine 12 via the hub 36 and by a second prime mover or auxiliary motor 62. In the example provided, the pump 50 includes a first and second driven gear 64, 66 rotationally fixedly connected to the pump input shaft 56, as best seen in FIGS. 2 and 3. The first driven gear 64 is in mesh with and is selectively driven by the first drive gear 48. The second driven gear 66 is in mesh with an idler gear 68. The idler gear 68 is a free-wheeling gear mounted on a support or idler shaft 70. The idler gear 68 is also in mesh with a second drive gear 72. The second drive gear 72 is rotationally, fixedly mounted to an output shaft 74 of the auxiliary motor 62. The auxiliary motor 62 is preferably mounted within the bell housing 32 and the output shaft 74 extends through the bell housing 32 to the transmission side 58.

By mounting the gears 48, 64, 66, 68, and 72 on the transmission side 58, the gears 48, 64, 66, 68, and 72 benefit from a wet environment (i.e. oiled). Alternatively, the pump system 30 may be longitudinally reversed such that the gear train 76 may be located in the bell housing 32 while the pump 50 and the auxiliary motor 56 may be located on the transmission side 58.

Accordingly, the pump 50 is driven by a gear train 76 that comprises the first and second drive gears 48, 72, the idler gear 68, and the first and second driven gears 64, 66. Preferably, each of the gears 48, 64, 66, 68, and 72 share a common radial centerline in order to minimize misalignment of the gears train 76 during assembly, thereby reducing gear clash and noise pollution. However, it should be appreciated that the gear train 76 may have off-centerline gears without departing from the scope of the present invention. It should also be understood that the hydraulic pump 50 and the auxiliary motor 62 may be disposed proximate the hub 36 at any convenient circumferential location. In addition, each of the gears 48, 64, 66, 68, and 72 are preferably involute spline gears which are tolerant of misalignment. This is especially helpful during bending of the transmission 14 during turning of the motor vehicle. However, it should be appreciated that other types of gears may be employed without departing from the scope of the present invention. The gears 48, 64, 66, 68, and 72 may be made from any suitable material, such as powdered metal or plastic, without departing from the scope of the present invention.

The diameter and tooth count of each of the gears 48, 64, 66, 68, and 72 may vary and is a function of the type pump 50 and auxiliary motor 62 employed, as well as other factors relating to the hydraulic needs of the transmission 14. For example, in a one embodiment, the pump 50 is a 7 cc to 10 cc positive displacement pump, such as a vane pump, gear pump or gerotor pump. The auxiliary motor 62 is preferably a small, high speed electric motor. Therefore, the gear train 76 is configured through gear diameter and tooth count to multiply torque from the auxiliary motor 62 to the pump 50 at about 4:1 or 5:1. To improve slow speed operation and priming, the first drive gear 48 may have a diameter larger than the diameter of the first driven gear 64, thereby increasing the relative rotational speed of the pump 50. As those familiar with gear train assemblies will readily understand, if it is desired that the hydraulic pump 50 rotate more slowly than the hub 36, the larger and smaller diameter drive members need only be interchanged.

In order to minimize drag on the pump system 30, the gear train 76 preferably includes two one-way clutches or one selectively actuated two-way clutch. Various configurations may be employed, however, the purpose of the one way clutches is to allow whichever of the drive gears 48 and 72 is running slower than the other to freewheel, thereby preventing drag on the pump 50. For example, the gear train 76 includes a first one-way clutch 80 and a second one-way clutch 82. The one-way clutches 80, 82 may be of any type, such as roller clutches, sprag clutches, or diode clutches, without departing from the scope of the present invention. In the example provided, the first one-way clutch 80 is connected between the pump hub 40 and the first drive gear 48. The first one-way clutch 80 is configured to allow the first drive gear 48 to freewheel in a rotational direction relative to the hub 36 when the auxiliary pump 62 is driving the pump 50. The second one-way clutch 82 is connected between the drive shaft 56 and the second driven gear 66. The second one-way clutch 82 is configured to allow the second driven gear 66 to freewheel in a rotational direction relative to the pump drive shaft 56 when the engine 12 is driving the pump 50. Turning to FIG. 4, an example of the second one-way clutch 82 integrated with the first and second driven gears 64 and 66 is illustrated. In the example provided, the one-way clutch 82 is a roller one-way clutch. An outer race 84 of the one-way clutch 82 is configured on an inside surface 86 of the first driven gear 64. An inner race 88 is configured on an outside surface 90 of the second driven gear 66. Rollers or sprag elements 92 are located between the inner and outer races 84, 88. Biasing members (not shown) and ramps (not shown) may be integrated with the inner and outer races 84 and 88, respectively.

With reference to FIG. 5, in an alternate embodiment, the one-way clutch 82 is shown integrated with the pump 50 where the pump 50 is a gerotor pump. The pump 50 is preferably located within a pocket 94 located within the bell housing 32. The pump 50 includes an outer drive member 100 and an inner driven member 102. The drive member 100 is rotationally fixed to the first driven gear 64 and rotationally coupled through the one-way clutch 82 to the drive shaft 56 and therefore the second driven gear 66. The inner drive member 102 is freely rotatable on a support shaft 104. Similar to the embodiment shown in FIG. 4, the one-way clutch 82 has inner and outer races that are formed on surfaces of the first driven gear 64 and, in the example provided, the pump input shaft 56. However, it should be appreciated that the one-way clutches 80 and 82 may be separately configured from the components of the pump system 30 without departing from the scope of the present invention.

With combined reference to FIGS. 1 and 2, during normal operation of the powertrain 10, the pump 50 may be operated as a single drive pump wherein only one of the prime movers is powering the pump 50 at a given time, or as a dual drive pump wherein one prime mover is used to augment the other prime mover during certain operating conditions. For example, during normal operating conditions with the engine 12 operating at approximately 1000 RPM (a highway duty cycle), the engine 12 drives the pump 50 through the hub 36 of the starting device 16, through the first drive gear 48 to the first driven gear 64, and from the first driven gear 64 to the drive shaft 56. However, during conditions where the engine 12 is operating at a lower duty cycle, such as at 500 RPM during a hot, idle garage shift, the auxiliary pump 62 is used to power the pump 50 through the second drive gear 72, through the idler gear 68 and the second driven gear 66, to the drive shaft 56. The pump 50 sized for mechanical drive from the engine at 1000 RPM at normal operating temperature could be half the displacement of a pump sized for mechanical drive from the engine for a hot idle garage shift at 500 rpm. Accordingly, the pump 50 may be reduced in size, therefore increasing fuel economy.

During operation of the powertrain 10, the motor vehicle will occasionally enter engine stop-start conditions. Engine stop-start occurs when the motor vehicle has temporarily stopped during operation, such as at a traffic light, stop sign, or due to traffic or other temporary conditions. During an engine stop-start, the engine 12 shuts down to increase fuel economy. However, it is important that the clutches/brakes within the transmission 14 remain primed (i.e. hydraulically actuated to an engaged position) with low pressure hydraulic fluid in order to allow swift and noiseless gear engagement when the engine 12 starts. Accordingly, during a stop-start, when the engine 12 is off, the auxiliary motor 62 is engaged at a low duty cycle to drive the pump 50 in order to keep the clutch circuits filled. As the engine 12 starts during vehicle take-off, the auxiliary motor 62 ramps up to a higher duty cycle (e.g. 4000 RPM) in order to fully engage the appropriate clutches/brakes. The engine 12 restart masks the noise of the auxiliary motor 62. Once the engine 12 has reached a normal duty cycle, the auxiliary motor 62 is disengaged and the engine 12 continues to drive the pump 50.

The construction and configuration of the hydraulic pump 50 provides high pumping efficiency. Such efficiency is the result of several aspects of the pump 50 of the present invention. First of all, in its preferred configuration and disposition, it is mounted off-axis in a transmission. The overall smaller pump diameter and component size of an off-axis pump reduces rotational and sliding friction, reduces rotating internal leakage and permits tighter tolerances, all factors which improve operating efficiency. In addition, an off-axis design facilitates other drive arrangements such as by a dedicated electric motor which has the additional capability of driving the pump when the engine is not running in, for example, engine start-stop (ESS) applications.

The off-axis design of the pump-system 30 allows a rotational speed increase or decrease relative to the rotational speed of the engine 12 and the auxiliary motor 62. This is useful because the typical limiting (minimum) pump flow occurs at low RPM, such as engine idle speed, and it may be desirable to increase this speed such that pump flow is greater at low engine speeds.

Figure 6:
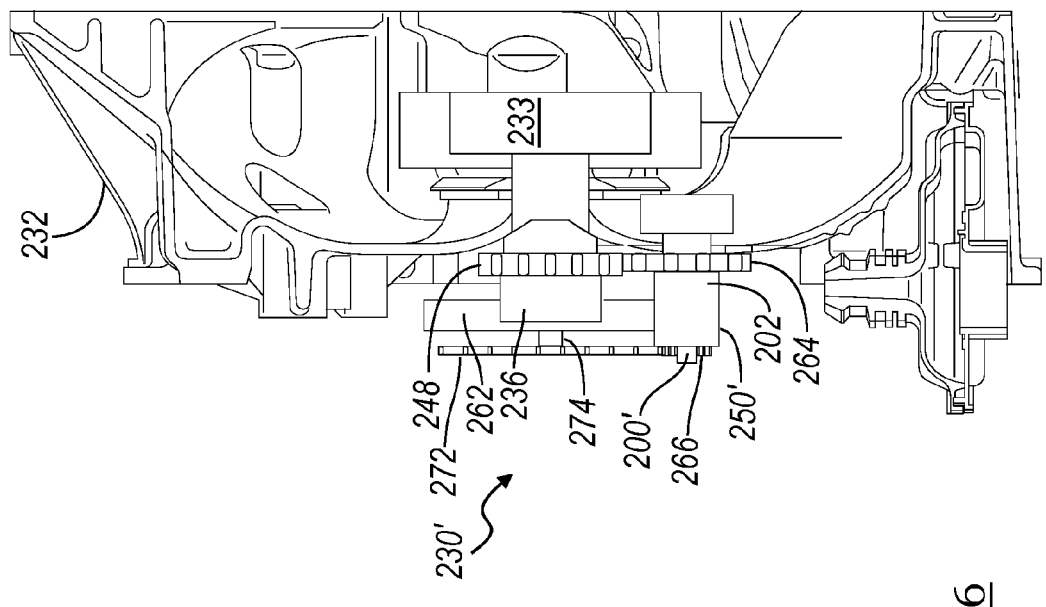
FIG. 6 is a partial cross-sectional side view of a front wheel drive housing according to the principles of the present invention.
Figure 7:
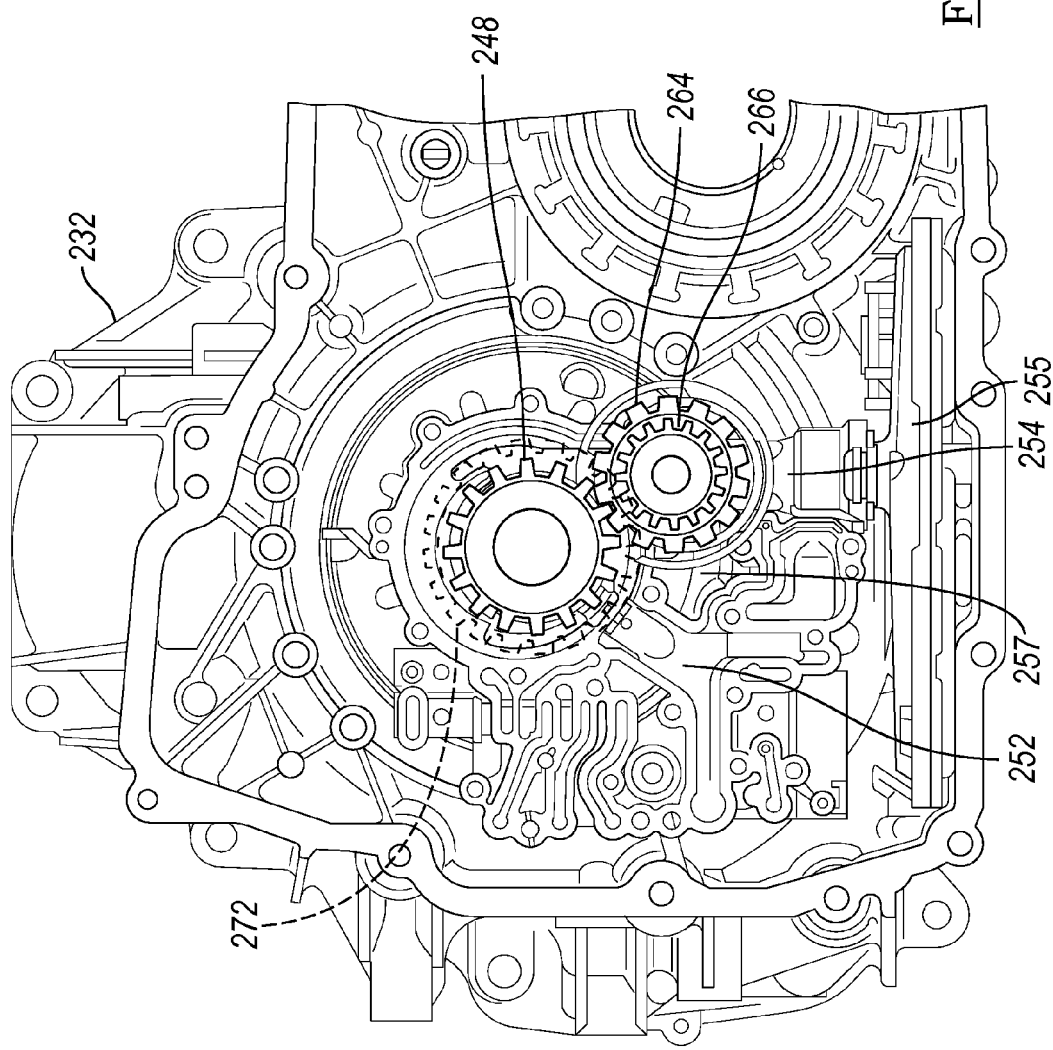
FIG. 7 is a partial cross-sectional rear view of a front wheel drive housing according to the principles of the present invention.

Turning to FIGS. 6 and 7, a front wheel drive embodiment of the dual pump system is generally indicated by reference number 230 and illustrated with an exemplary front wheel transmission drive bell housing 232. A starting device 233 is housed within the bell housing 232. The bell housing 232 is generally cast aluminum and includes openings, counterbores, flanges, shoulders and other features which receive, locate and support the various components of the starting device 232 as well as the dual pump system 230. The starting device 233 is substantially similar to the starting device 16 of the rear wheel drive transmission and generally includes an engine driven hub 236. The hub 236 extends through the bell housing 232 to a transmission side 235 of the bell housing 232. A first drive gear 248 is fixedly connected to the hub 236 by any suitable means such as, for example, complementary flats, interengaging splines, one or more drive pins or set screws, a friction fit or a combination of any of these elements.

The pump system 230 includes an off-axis pump 250. The pump 250 is mounted in pump body 252 which typically includes a fluid inlet or suction passageway 254 for the pump 250 that communicates with a sump 255 and an outlet port 257 that communicates with various components in the transmission via the pump body 252. In the example provided, the pump 250 is a cartridge vane pump having a drive shaft or input shaft 256.

The pump 250 is driven by two prime movers including the engine via the hub 236 and by a second prime mover or auxiliary motor 262. In the example provided, the pump 50 includes a first and second driven gear 264, 266 rotationally fixedly connected to the pump input shaft 256. The first driven gear 264 is in mesh with and is selectively driven by the first drive gear 248. The second driven gear 266 is in mesh with a second drive gear 272. The second drive gear 272 is rotationally, fixedly mounted to an output shaft 274 of the auxiliary motor 262. The auxiliary motor 262 is preferably mounted on-axis with the hub 236 on the transmission side 258. However, it should be appreciated that the auxiliary motor 262 may be mounted off-axis without departing from the scope of the present invention.

Accordingly, the pump 250 is driven by a gear train 276 that comprises the first and second drive gears 248, 272 and the first and second driven gears 264, 266. Preferably, each of the gears 248, 264, 266 and 272 share a common radial centerline in order to minimize misalignment of the gears train 276 during assembly, thereby reducing gear clash and noise pollution. However, it should be appreciated that the gear train 276 may have off-centerline gears without departing from the scope of the present invention. It should also be understood that the hydraulic pump 250 and the auxiliary motor 262 may be disposed proximate the hub 236 at any convenient circumferential location. In addition, each of the gears 248, 264, 266 and 272 are preferably involute spline gears which are tolerant of misalignment. However, it should be appreciated that other types of gears may be employed without departing from the scope of the present invention. The gears 248, 264, 266 and 272 may be made from any suitable material, such as powdered metal or plastic, without departing from the scope of the present invention.

The diameter and tooth count of each of the gears 248, 264, 266 and 272 may vary and is a function of the type pump 250 and auxiliary motor 262 employed, as well as other factors relating to the hydraulic needs of the transmission. The auxiliary motor 262 is preferably a small, high speed electric motor. Therefore, the gear train 276 is configured through gear diameter and tooth count to multiply torque from the auxiliary motor 262 to the pump 250 at about 4:1 or 5:1. To improve slow speed operation and priming, the first drive gear 248 may have a diameter larger than the diameter of the first driven gear 264, thereby increasing the relative rotational speed of the pump 250. As those familiar with gear train assemblies will readily understand, if it is desired that the hydraulic pump 250 rotate more slowly than the hub 236, the larger and smaller diameter drive members need only be interchanged.

In order to minimize drag on the pump system 230, the gear train 276 preferably includes two one-way clutches or one selectively actuated two-way clutch. Various configurations may be employed, however, the purpose of the one way clutches is to allow whichever of the drive gears 248 and 272 is running slower than the other to freewheel, thereby preventing drag on the pump 250. For example, the one-way clutches may be configured as shown in FIGS. 4 and 5 and may be located on the pump 250 or the auxiliary motor 262 or the hub 236.

Figure 8:
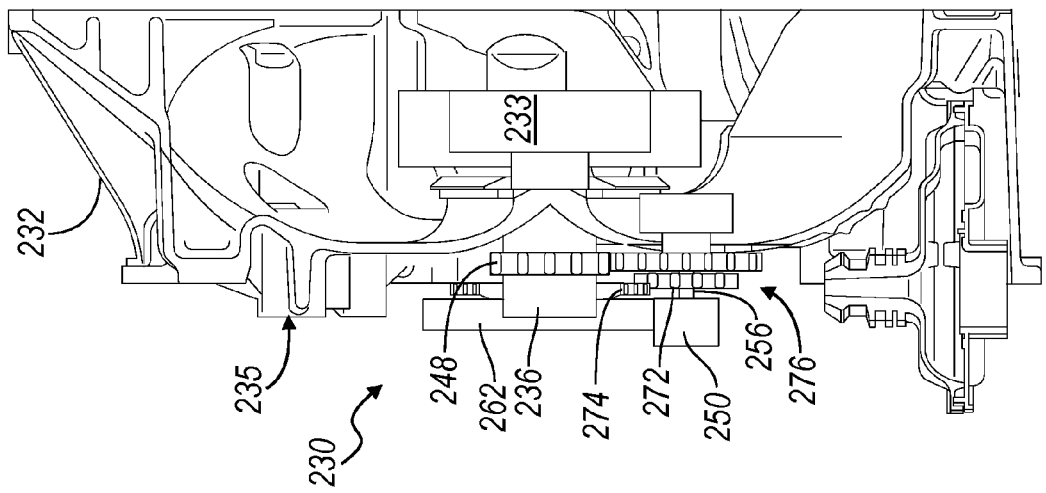
FIG. 8 is a partial cross-sectional side view of another embodiment of a front wheel drive housing according to the principles of the present invention.

With reference to FIG. 8, an alternate hydraulic pump system 230' is illustrated. The pump system 230' is substantially similar to the pump system 230, and like components are indicated by like reference numbers. However, in the hydraulic pump system 230', the pump 250 is replaced with a pump 250'. The pump 250' is a gear pump having an inner drive member 200' and an outer drive member 202. The second driven gear 266 is directly coupled to the inner drive member 200' and the first driven gear 264 is directly coupled to the outer drive member 202.

The front wheel drive pump systems 230, 230' shown in FIGS. 6, 7, and 8 offer the same advantages and benefits of the pump system 30 shown in FIGS. 1-5, providing dual drive pump modes and engine stop start capabilities.

The description of the invention is merely exemplary in nature and variations that do not depart from the gist of the invention are intended to be within the scope of the invention. Such variations are not to be regarded as a departure from the spirit and scope of the invention.

The following is claimed:

1. A device for a front wheel drive transmission in a vehicle, the device comprising:
   a first prime mover;
   a first drive shaft rotatable by the first prime mover;
   a second prime mover;
   a second drive shaft rotatable by the second prime mover; and
   a hydraulic pump having a rotor that defines an axis of rotation that is parallel with and spaced apart from the first drive shaft and the second drive shaft;
   a pump input shaft connected to the rotor;
   a first gear set including a first drive gear fixed for rotation on the first drive shaft and a first driven gear fixed for rotation on the pump input shaft and intermeshed with the first drive gear; and
   a second gear set including a second drive gear fixed for rotation on the second drive shaft and a second driven gear fixed for rotation on the pump input shaft and intermeshed with the second drive gear,
   wherein the rotor is selectively engaged with each of the first drive shaft and the second drive shaft for transferring torque between the rotor and at least one of the first prime mover and the second prime mover.

2. The device of claim 1 further comprising a first one-way clutch connected between the first drive gear and the first drive shaft for allowing free relative rotation between the rotor of the pump and the first prime mover when the second prime mover is driving the rotor and for transferring torque from the first drive shaft to the first gear set and the rotor when the first prime mover is driving the rotor.

3. The device of claim 2 further including a second one-way clutch connected between the second driven gear and the pump input shaft for allowing relative rotation between the rotor of the pump and the second prime mover when the first prime mover is driving the rotor and for transferring torque from the second drive shaft to the second gear set and the rotor when the second prime mover is driving the rotor.

4. The powertrain of claim 3 wherein the second one-way clutch is disposed within the first driven gear.

5. The device of claim 1 wherein the first prime mover is a combustion engine.

6. The device of claim 5 wherein the second prime mover is an electric motor.

7. The device of claim 6 wherein the second gear set is configured to multiply torque from the second prime mover to the rotor at about 4:1 to about 5:1.

8. The device of claim 1 wherein the hydraulic pump is a gear pump having an inner drive member and an outer drive member interconnected to the rotor, and the first prime mover is interconnected to the outer drive member and the second prime mover is interconnected to the inner drive member.

9. A powertrain for a vehicle, the powertrain comprising:
an engine;
a torque converter having a bell housing and an input driven by the engine and having an output driven by the input;
a transmission having a transmission housing and drivingly connected to the output of the torque converter;
an electric motor;
a drive shaft driven by the electric motor; and
a hydraulic pump disposed within the bell housing and having a rotor that defines an axis of rotation that is parallel with and radially offset from the output and the drive shaft;
a pump input shaft connectable to the rotor of the pump that extends through the bell housing;
a first gear set disposed within the transmission housing and connected to the output of the torque converter and the pump input shaft;
a second gear set disposed within the transmission housing and connected to the drive shaft of the electric motor and the pump input shaft;
wherein the rotor is connectable for common rotation with each of the output and the drive shaft for providing torque to the rotor from at least one of the engine and the electric motor.

10. The powertrain of claim 9 wherein the first gear set includes a first drive gear disposed on the output and a first driven gear connected for rotation with the pump input shaft and intermeshed with the first drive gear of the first gear set.

11. The powertrain of claim 10 wherein the second gear set includes a second drive gear disposed on the drive shaft and a second driven gear connected for rotation with the pump input shaft and intermeshed with the second drive gear of the second gear set.

12. The powertrain of claim 11 further comprising a first one-way clutch connected between the starting device and the rotor of the pump for allowing free relative rotation between the rotor of the pump and the starting device when the electric motor is driving the rotor and for transferring torque from the output to the first gear set and the rotor when the engine is driving the rotor.

13. The powertrain of claim 12 further including a second one-way clutch connected between the electric motor and the rotor of the pump for allowing relative rotation between the rotor of the pump and the electric motor when the engine is driving the rotor and for transferring torque from the drive shaft to the second gear set and the rotor when the electric motor is driving the rotor.

14. The powertrain of claim 13 wherein the second gear set is configured to multiply torque from the second prime mover to the rotor at about 4:1 to about 5:1.

15. A device for a powertrain in a vehicle, the device comprising:
a first prime mover;
a hydrodynamic starting device driven by the first prime mover;
a hub rotatable by the hydrodynamic starting device;
a second prime mover;
an output shaft rotatable by the second prime mover and coaxial with the hub;
a hydraulic pump having a rotor that defines an axis of rotation that is parallel with and spaced apart from the hub and the output shaft;
a first gear set including a first drive gear fixed for rotation on the hub and a first driven gear fixed for rotation on the rotor of the hydraulic pump and intermeshed with the first drive gear; and
a second gear set including a second drive gear fixed for rotation on the output shaft and a second driven gear fixed for rotation on the rotor of the hydraulic pump and intermeshed with the second drive gear,
wherein the rotor is selectively engaged with each of the hub and the output shaft for transferring torque between the rotor and at least one of the first prime mover and the second prime mover.

* * * * *